United States Patent Office 2,745,840
Patented May 15, 1956

2,745,840

RECOVERY AND PURIFICATION OF SACCHARIN

Frederick Comte, Kirkwood, Mo., assignor to Monsanto Chemical Company, St. Louis, Mo., a corporation of Delaware No Drawing. Application April 8, 1953,
Serial No. 347,625

8 Claims. (Cl. 260—301)

This invention relates to saccharin and more specifically pertains to the recovery of a substantially pure tasteless saccharin from crude saccharin.

The final step in one synthesis of saccharin comprises the oxidation of o-toluenesulfonamide to o-sulfobenzimide, saccharin. This oxidation may be accomplished in an aqueous medium by such oxidizing agents as the permanganates and chromic acid. The recovered crude saccharin precipitated during oxidation contains as impurities chrome sulfate, unoxidized o-toluenesulfonamide and p-sulfamylbenzoic acid. Chrome sulfate can be readily removed from the crude saccharin, but the complete removal of o-toluenesulfonamide and p-sulfamylbenzoic acid is difficult. Furthermore, the presence of other impurities contributes to a slight bitter aftertaste in saccharin made by this method. Since large quantities of saccharin are employed as a non-nutrient or no-calory sweetening agent in the manufacture of processed foods or by the consumer as a sweetening agent in such beverages as coffee and tea, it is extremely important that o-toluenesulfonamide and p-sulfamylbenzoic acid as well as other impurities be completely removed. o-Toluenesulfonamide is an intermediate in such a synthesis of saccharin and the amount recovered can be recycled to the oxidation step. The p-sulfamylbenzoic acid produced from p-toluenesulfonamide during the synthesis of saccharin, although not an intermediate in the synthesis of saccharin, is a useful intermediate in the synthesis of other organic compounds.

One method of purifying crude saccharin made by the above process involves adding the saccharin to an aqueous solution or slurry of an alkaline material which will convert the water-insoluble sulfobenzimide to a water-soluble salt. For example, sodium carbonate, sodium hydroxide, potassium hydroxide, calcium carbonate, calcium hydroxide may be employed as alkaline materials used to form water-soluble salts of saccharin. The resulting aqueous solution may be decolorized and clarified before the saccharin is reprecipitated by acidifying the aqueous solution to a pH of from 1.5 to 2.5 with a dilute mineral acid such as dilute hydrochloric acid. However, not only is the insoluble saccharin precipitated but also there is precipitated a sizable portion of other acidic materials. It is, of course, obvious that such a process would reprecipitate such materials as o-toluenesulfonamide and o-sulfamylbenzoic acid. However, saccharin produced in this manner has a somewhat bitter aftertaste. It would be believed that the properties of these three materials were too similar to permit an efficient removal of the sulfonamide and the sulfamylbenzoic acid from saccharin.

It is an object of this invention to provide a method for purifying the crude saccharin obtained from the oxidation of o-toluenesulfonamide. Another object of this invention is to provide a purified saccharin which does not possess a bitter aftertaste. It is also an object of this invention to provide a method of purifying crude saccharin obtained from the oxidation of o-toluenesulfonamide whereby the impurities are quickly extracted from the crude saccharin leaving a substantially pure saccharin which has no bitter aftertaste and at the same time provide a method for recovering any extracted saccharin in a pure usable state as well as recovering each of the valuable impurities. Other objects of this invention will be apparent from the description of this invention.

It has been discovered that the sulfonamide, the sulfamylbenzoic acid and other impurities together with some saccharin can be removed from the crude saccharin by dissolving the crude saccharin in a low boiling water-soluble solvent, such as glycol, acetone or an alcohol preferably a water-soluble solvent having an appreciable vapor pressure at 100° C., and cooling the solution to a temperature between about 0° C. and 25° C. to recrystallize therefrom 90% or more of the dissolved saccharin. Furthermore, up to 80% of the remaining solvent mother liquor can be reused together with fresh solvent for subsequent purification of crude saccharin. In fact reuse of 80% of the solvent mother liquors can be employed indefinitely. For example, 80% of the mother liquors from the first purification of crude saccharin is combined with fresh solvent and employed in the purification of a second batch of crude saccharin. Then 80% of the mother liquors from the purification of the second batch is combined with fresh solvent and employed to purify a third batch of crude saccharin. The 20% portion of the mother liquors not used for purification of the next batch of crude saccharin are accumulated and processed for recovery of the solvent and the products dissolved therein as hereinafter described.

Also it has been discovered that although the properties of o-toluenesulfonamide, p-sulfamylbenzoic acid and saccharin are quite similar, these three materials can be readily and conveniently individually precipitated from an aqueous solution containing a soluble form of these three compounds. As hereinbefore stated, one process which involves converting the crude saccharin to a water-soluble mixture, dissolving the crude mixture in an aqueous alkaline solution and reprecipitating the saccharin by acidifying the solution, produced the bitter aftertaste product because the impurities also reprecipitated. However, quite unexpectedly, it has been discovered that each of the three similar organic compounds present in crude saccharin can be quantitatively and individually precipitated at three different acidic pH levels from a cool to cold aqueous solution containing a water-soluble form of these three compounds by acidifying said aqueous solution with a dilute mineral acid such as dilute hydrochloric acid, 10% muriatic acid, or dilute sulfuric acid.

The solvents which are preferred in the purification step are the lower aliphatic alcohols, such as methanol, ethanol and the propanols and of these alcohols isopropanol is preferred.

The following is a detailed description of the use of the cooperative processes of this invention as carried out in industrial practice.

To a kettle of suitable size provided with a heating jacket, stirrer and a reflux condenser there is charged 600 gallons of wet isopropanol containing 12% to 15% water. There is dissolved in the alcohol with stirring 1250 pounds of crude saccharin from the oxidation step containing about 20% moisture. To the solution there is added purified decolorizing charcoal. About 20 pounds of a sugar clarifying charcoal is a sufficient quantity for this size batch. The resulting mixture is stirred, heated to boiling (about 82° C.), refluxed for about 30 minutes and then filtered while hot through a precoated filter. The clear filtrate, about 780 gallons, is collected and charged to a crystallizer. The filter is washed with about 30 gallons of hot isopropanol.

The 780 gallons of clear filtrate is cooled as rapidly as possible to about 5° C. to crystallize the saccharin out of solution, the resulting slurry is filtered by any suitable means such as with a centrifuge filter to recover the crystalline saccharin and the alcoholic mother liquor is saved. The recovered crystalline material is first washed with about 30 gallons of cold isopropanol which is collected and added to the mother liquor, and then washed with filtered water to remove the alcohol solvent. The water wash containing up to about 10% isopropanol can be saved, combined with other water washes and fractionated to recover the isopropanol values. About 1020 pounds of wet saccharin is recovered which when dried at 100° C. yields 870 pounds (over 90% of the saccharin in the crude mixture) of white crystalline saccharin powder having a melting point of 228.5° to 229.6° C., a chlorides content of less than 0.16%, less than 0.5% moisture, less than 20 p. p. m. of heavy metals, less than 0.2% ash, gives a negative test for benzoic and salicylic acids, has no foreign odor, and contains a minimum of 98% saccharin. Furthermore, this saccharin has no bitter aftertaste.

The alcoholic mother liquor and the isopropanol wash liquors as well as the waterwash liquor can be subjected to recovery of the materials dissolved therein after the first recrystallization purification or they can be handled in the following manner. The alcoholic mother liquor together with the isopropanol used to wash the crystals are combined and amount to about 600 gallons. About 80% of this alcoholic mixture, or 480 gallons, the 30 gallons of hot isopropanol employed to wash the filtering equipment and about 100 gallons of fresh 85% to 88% isopropanol are charged to dissolve a second batch of 1250 pounds of crude wet saccharin obtained from the oxidation step. The above purification process is repeated. This recycling of alcoholic mother liquor can be repeated indefinitely. After six batches of crude wet saccharin have been purified there will have accumulated about 840 gallons of alcoholic mother liquors and about 550 gallons of alcoholic water from the water washes. From these accumulated liquors the isopropanol dissolved saccharin, o-toluenesulfonamide and p-sulfamylbenzoic acid are recovered in the following manner.

The alcoholic mother liquor is charged to a suitable still for fractionation. The acidity of this liquor is reduced from a pH of about 2.2 to about 8.0 by the addition of a strong alkali such as sodium or potassium hydroxide. The alkaline alcoholic solution is subjected to fractionation whereby wet isopropanol, 85% to 88% alcohol, is recovered. When the alcohol concentration in the condensate drops below 85% (about 710 gallons of 85% to 88% isopropanol recovered), the fractionation is interrupted and the aqueous alcoholic liquor accumulated from the water washes is charged to recover the alcohol dissolved therein. To the resulting mixture there is added sufficient alkali to re-adjust the pH to 8.0 and fractionation is resumed. The reflux ratio is constantly increased to recover as much 85% to 88% isopropanol as possible. When the alcoholic condensate withdrawn contains less than 85% isopropanol, the remaining alcoholic condensate, containing about 34% isopropanol, is distilled off as rapidly as possible and collected for further processing. The specific gravity of the condensate now approaches that of water and about 160 gallons of water is distilled off and discarded to concentrate the end liquor. Such an operation in addition to the water discarded recovers about 785 gallons of 85% to 88% isopropanol, 114 gallons of 34% isopropanol and 260 gallons of end liquor.

The end liquor is then processed in the following manner to recover o-toluenesulfonamide. The end liquor, a yellow solution containing Cr(OH)$_3$ flocks and having a pH of 6 to 7, is filtered while hot to recover Cr(OH)$_3$. The resulting clear filtrate is cooled to at least 20° C. and its pH adjusted with alkali or mineral acid, preferably 10% muriatic acid, to a pH of 6 as needed. The slurry of precipitated o-toluenesulfonamide which forms is filtered, the filtrate collected, and the recovered sulfonamide dried. In this way about 60 pounds, a quantitative recovery, of o-toluenesulfonamide having a melting point of 153° to 155° C. is obtained which can be recycled to the oxidation process.

The filtrate from the recovery of o-toluenesulfonamide is stirred and cooled to at least 20° C., further acidified by slowly adding 10% muriatic acid thereto until the acidity remains constant at pH 3.5, and is stirred for about 30 minutes or until the precipitation of p-sulfamylbenzoic acid is complete. The resulting slurry is filtered, the filtrate collected and the p-sulfamylbenzoic acid, about 36 pounds (a quantitative yield) is dried and saved for further use.

The filtrate from p-sulfamylbenzoic acid recovery is stirred and cooled to at least 20° C., further acidified to pH 1.5 with 10% muriatic acid whereby saccharin precipitates. The resulting acidic slurry is stirred for an additional 20 minutes or until the precipitation of saccharin is complete. The slurry is filtered, the aqueous liquor discarded, and the crystalline saccharin is washed with water and dried. In this manner about 126 pounds, a quantitative yield, or dry saccharin having a melting point of 225° to 227° C. is recovered. This saccharine was recycled to the alcohol recrystallization step for purification.

Saccharin recovered by the reworking of the accumulated end liquors from six batches as described above and that recovered from the reworking of ten batches of accumulated end liquors had the following properties after being recrystallized from isopropanol washed with water and dried.

|  | Recovered from 6 Batches | Recovered from 10 Batches |
| --- | --- | --- |
| Appearance | White crystalline powder. | White crystalline powder. |
| Chlorides | 0.002% | 0.001%. |
| Heavy Metals | Less than 2 p. p. m. | 1.0 p. p. m. |
| Melting Point | 228.5° to 229.3° C | 228.3° to 229.1° C. |
| Moisture | 0.7% | 0.6%. |
| Odor | None | None. |
| Ash | 0.03% | Less than 0.01%. |
| Flavor | No bitter aftertaste | No bitter aftertaste. |

The above stepwise precipitation is repeated with equal success except that dilute sulfuric acid is employed to achieve the desired pH levels.

In addition to the advantages hereinbefore pointed out, it will be noted that the process of this invention does not employ toxic materials or materials which will form a toxic residue on the saccharin and thereby contaminate the saccharin. The simplicity of operation and control of each process step provide a process which is especially suited for industrial application. Furthermore, substantially all of the solvent can be recovered, substantially all of the saccharin in the crude (less handling loss) can be recovered and, at the same time, there is recovered in substantially quantitative yields two useful organic compounds, o-toluenesulfonamide and p-sulfamylbenzoic acid, which would otherwise be lost.

What is claimed is:

1. The process for recovering individually saccharin, o-toluenesulfonamide and p-sulfamylbenzoic acid from a mixture thereof which comprises dissolving the mixture in a low boiling water-soluble solvent selected from the class consisting of glycol, acetone and lower alkanols, recrystallizing a major proportion of the saccharin from the solution, alkalizing the solvent mother liquor, fractionating the resulting alkaline solvent solution to recover the solvent, dissolving the residue in water, successively stepwise acidifying said aqueous solution with a mineral acid to precipitate o-toluenesulfonamide at a pH of 6, p-sulfamylbenzoic acid at a pH of 3.5 and saccharin at a pH of 1.5 and recovering each of said compounds before further acidifying the aqueous mixture to precipitate the next compound whereby the saccharin so recovered is characterized by the property of being free from bitter aftertaste.

2. The process of claim 1 wherein the acidifying acid is dilute hydrochloric acid.

3. The process of claim 1 wherein the acidifying acid is 10% muriatic acid and the solvent is isopropanol.

4. The process of claim 1 wherein the acidifying acid is dilute sulfuric acid.

5. The process for preparing substantially pure saccharin comprising: dissolving crude saccharin containing saccharin, o-toluenesulfonamide and p-sulfamylbenzoic acid in a solvent comprising fresh isopropanol and a major portion of the mother liquor from a previous saccharin purification process comprising isopropanol containing dissolved therein saccharin, o-toluenesulfonamide and p-sulfamylbenzoic acid; recrystallizing a major portion of the saccharin therefrom; recycling a major portion of the mother liquor from this recrystallization to the next crude saccharin purification process; washing the recrystallized saccharin with a portion of fresh isopropanol and adding this isopropanol to the minor portion of the mother liquor; washing the recrystallized saccharin with water to provide a saccharin free from bitter aftertaste; alkalizing the accumulated mixture of the minor portion of the mother liquor and the wash isopropanol; fractionating the resulting alkaline alcoholic solution to recover the alcohol; dissolving the residue from the fractionation in water; filtering the aqueous solution to remove any undissolved metal residue; successively step-wise acidifying said aqueous solution with a mineral acid to precipitate o-toluenesulfonamide at a pH of 6 p-sulfamylbenzoic acid at a pH of 3.5 and saccharin at a pH of 1.5; and recovering each of said compounds before further acidifying the aqueous mixture to precipitate the next compound, whereby the saccharin so recovered by acidification is also characterized by the property of being free from bitter aftertaste.

6. The process of claim 5 wherein the water added to dissolve the fractionation residue is that from the water wash of the recrystallized saccharin.

7. The process for preparing substantially pure saccharin comprising: dissolving crude saccharin containing o-toluenesulfonamide and p-sulfamylbenzoic acid in a lower alkanol solvent comprising fresh lower alkanol and a major portion of the mother liquor from a previous saccharin purification process comprising the lower alkanol containing dissolved therein saccharin o-toluenesulfonamide and p-sulfamylbenzoic acid; recrystallizing a major portion of the saccharin therefrom; recycling a major portion of the mother liquor from this recrystallization to the next crude saccharin purification process; washing the recrystallized saccharin with a portion of fresh lower alkanol and adding this lower alkanol to the minor portion of the motion liquor; washing the recrystallized saccharin with water to provide a saccharin free from bitter aftertaste; alkalizing the accumulated mixture of the minor portion of the mother liquor and the wash isopropanol; fractionating the resulting alkaline alcoholic solution to recover the lower alkanol; dissolving the residue from the fractionation in water; filtering the solution to remove any undissolved metal residue; successively step-wise acidifying said aqueous solution with a mineral acid to precipitate o-toluenesulfonamide at a pH of 6, p-sulfamylbenzoic acid at a pH of 3.5 and saccharin at a pH of 1.5; and recovering each of said compounds before further acidifying the aqueous mixture to precipitate the next compound, whereby the saccharin so recovered by acidification is also characterized by the property of being free from bitter aftertaste.

8. In the purification of saccharin by a process including dissolving crude saccharin containing o-toluenesulfonamide and p-sulfamylbenzoic acid in a lower alkanol, recrystallizing a portion of the saccharin from said solution in the lower alkanol, washing the recrystallized saccharin with a fresh portion of lower alkanol and recycling a major portion of the mother liquor from the recrystallization the steps comprising: accumulating from successive purification processes the minor portion of mother liquor containing crude saccharin and the fresh lower alkanol employed for washing said recrystallized saccharin, alkalizing the accumulated alcoholic solution, fractionating the resulting alkaline alcoholic solution to recover the alcohol; providing an aqueous solution of the organic compounds in the fractionation residue, filtering said aqueous solution to remove any inorganic metal residue, successively step-wise acidifying said aqueous solution with a mineral acid to precipitate o-toluenesulfonamide at a pH of 6, p-sulfamylbenzoic acid at a pH of 3.5 and saccharin at a pH of 1.5 and recovering each of said compounds before further acidifying the aqueous mixture to precipitate the next compound.

References Cited in the file of this patent

UNITED STATES PATENTS

Re. 10,667    Fahlberg _____ Dec. 1, 1885

FOREIGN PATENTS 3,563    Great Britain _____ of 1903
6,065    Great Britain _____ of 1902
7,199    Great Britain _____ of 1900
12,585   Great Britain _____ of 1900
27,655   Great Britain _____ of 1896

OTHER REFERENCES

MacArdle: "Solvents in Synthetic Org. Chem." (Van Nostrand), pp. 12–16 (1925).